US008186672B2

(12) United States Patent
Mackenzie et al.

(10) Patent No.: US 8,186,672 B2
(45) Date of Patent: May 29, 2012

(54) CURRENCY CASSETTE CAPACITY MONITORING AND REPORTING

(75) Inventors: Bob Mackenzie, West Chester, PA (US); Stephen Marsh, Parkesburg, PA (US); Mark H. Greenawalt, W. Berkshire (GB); Bill Nichols, Headerson, NV (US); Phil Pascarella, West Chester, PA (US); Rick Lopez, Reno, NV (US); Peter Camilleri, West Chester, PA (US)

(73) Assignee: MEI, Inc., West Chester, PA (US)

( * ) Notice: Subject to any disclaimer, the term of this patent is extended or adjusted under 35 U.S.C. 154(b) by 21 days.

(21) Appl. No.: 11/751,444

(22) Filed: May 21, 2007

(65) Prior Publication Data

US 2008/0029953 A1 Feb. 7, 2008

Related U.S. Application Data

(60) Provisional application No. 60/802,375, filed on May 22, 2006.

(51) Int. Cl.
*B65H 43/00* (2006.01)
*G06F 7/00* (2006.01)

(52) U.S. Cl. ........................................ 271/176; 700/213

(58) Field of Classification Search .................. 271/176, 271/180, 177; 700/213, 214; 194/206, 207; 209/534; 902/13
See application file for complete search history.

(56) References Cited

U.S. PATENT DOCUMENTS

| | | | | |
|---|---|---|---|---|
| 4,678,072 | A | 7/1987 | Kobayashi et al. | |
| 4,765,607 | A | 8/1988 | Zouzoulas | |
| 5,209,335 | A | 5/1993 | Shuren et al. | |
| 5,357,314 | A * | 10/1994 | Tahara et al. | 355/75 |
| 5,639,081 | A * | 6/1997 | Hatamachi et al. | 271/177 |
| 5,709,293 | A | 1/1998 | Ishida et al. | |
| 5,709,525 | A | 1/1998 | Marzullo et al. | |
| 5,756,985 | A | 5/1998 | Holste et al. | |
| 5,782,469 | A | 7/1998 | Schoon et al. | |
| 5,836,577 | A | 11/1998 | Arikawa et al. | |
| 5,982,126 | A | 11/1999 | Hellinga et al. | |
| 6,038,491 | A | 3/2000 | McGarry et al. | |
| 6,076,648 | A | 6/2000 | Hatamachi et al. | |
| 6,199,856 | B1 | 3/2001 | Clauser et al. | |
| 6,398,000 | B1 | 6/2002 | Jenrick et al. | |
| 6,495,981 | B2 | 12/2002 | Romanowich et al. | |
| 6,572,318 | B2 * | 6/2003 | Cobene et al. | 412/11 |
| 6,598,871 | B2 | 7/2003 | Ono et al. | |
| 6,827,347 | B2 | 12/2004 | Ito et al. | |
| 6,948,607 | B2 * | 9/2005 | Ito et al. | 194/206 |
| 6,950,053 | B1 * | 9/2005 | Peterson | 342/20 |
| 7,229,071 | B2 * | 6/2007 | Gabel et al. | 271/180 |
| 7,245,871 | B2 * | 7/2007 | Kasahara | 399/405 |
| 2002/0063034 | A1 * | 5/2002 | Dobbins | 194/302 |
| 2003/0137096 | A1 * | 7/2003 | Ito et al. | 271/176 |

(Continued)

FOREIGN PATENT DOCUMENTS

DE 2 321 654 11/1974

(Continued)

*Primary Examiner* — Kaitlin Joerger
*Assistant Examiner* — Patrick Cicchino
(74) *Attorney, Agent, or Firm* — Pepper Hamilton LLP

(57) ABSTRACT

An indicator, such as an alarm or warning, is generated to indicate that a document storage cassette attached to a document handling device (e.g., a currency validator) has reached a particular capacity or is approaching its full capacity.

19 Claims, 6 Drawing Sheets

U.S. PATENT DOCUMENTS

| | | | | |
|---|---|---|---|---|
| 2005/0085941 | A1* | 4/2005 | Overskeid et al. | 700/214 |
| 2005/0183926 | A1 | 8/2005 | Deaville et al. | |
| 2006/0071413 | A1* | 4/2006 | Kaneko et al. | 271/220 |
| 2007/0007355 | A1* | 1/2007 | Gotoh et al. | 235/475 |
| 2007/0065166 | A1* | 3/2007 | Takiguchi et al. | 399/35 |
| 2007/0085263 | A1* | 4/2007 | Machida et al. | 271/145 |
| 2007/0176349 | A1* | 8/2007 | Gerlier et al. | 271/10.03 |
| 2008/0071418 | A1* | 3/2008 | Antony et al. | 700/214 |
| 2008/0126257 | A1* | 5/2008 | Ballard et al. | 705/59 |

FOREIGN PATENT DOCUMENTS

| | | | |
|---|---|---|---|
| EP | 0 720 132 | B1 | 7/1996 |
| JP | 11-116098 | | 4/1999 |
| WO | WO 02/066350 | A1 | 8/2002 |
| WO | WO 02/083537 | A1 | 10/2002 |

* cited by examiner

CURRENCY CASSETTE CAPACITY MONITORING AND REPORTING

CROSS-REFERENCE TO RELATED APPLICATION(S)

This application claims the benefit of priority from U.S. Provisional Patent Application No. 60/802,375, filed on May 22, 2006.

BACKGROUND

Document acceptor assemblies, such as those used in the vending and gaming industries, typically store accepted banknotes or other documents in a cassette. A stacking mechanism may be incorporated in the assembly to facilitate storage of the documents in the cassette.

In various industries, the cassettes (sometimes referred to as cash boxes) are removed in predefined cycles. In the gaming industry, removal of the cassette is referred to as a "drop." Removing the cassettes in predefined cycles can be wasteful because many of the cassettes may not be at, or near, capacity at the time of the drop. Another problem may arise as a result of cassettes becoming full in advance of the drop, thus rendering the gaming machine disabled until its scheduled drop.

SUMMARY

The disclosure relates to monitoring and reporting the capacity of a currency cassette.

An indicator (e.g., an alarm or warning) is generated to indicate that a currency storage cassette attached to a document handling device (e.g., a currency validator or other currency acceptor) has reached a particular capacity or is approaching its full capacity.

The indicator can include, for example, a visual or audio signal in the vicinity of the document acceptor so as to alert service personnel that the cassette is near full-capacity or that it is expected to reach full-capacity within the near future. Visual or audio indicators that readily can be sensed by service personnel can make it easier to identify when a full (or near-full) cassette needs to be exchanged for an empty one. The indicator of the cassette capacity can be controlled, for example, by the document acceptor's processor instead of the host gaming or vending machine. That can help avoid the need to make expensive changes to software in the host machine.

In some implementations, the physical indicator is provided when the cassette is filled to a predefined capacity (i.e., when the cassette contains at least a specified number of documents). In some implementations, the time at which the indicator occurs is based on a prediction as to when the cassette is expected to become filled to capacity. The predicted time can be based, for example, on the feed rate of documents inserted into the cassette and the actual number of documents stored in the cassette. Thus, in a particular scenario, an indicator or other message is provided if it is determined, based on the current feed rate and capacity, that the cassette is expected to become full within the next fifteen minutes.

Other features may be readily apparent from the following detailed description, the accompanying drawings and the claims.

DETAILED DESCRIPTION

Figure 1:
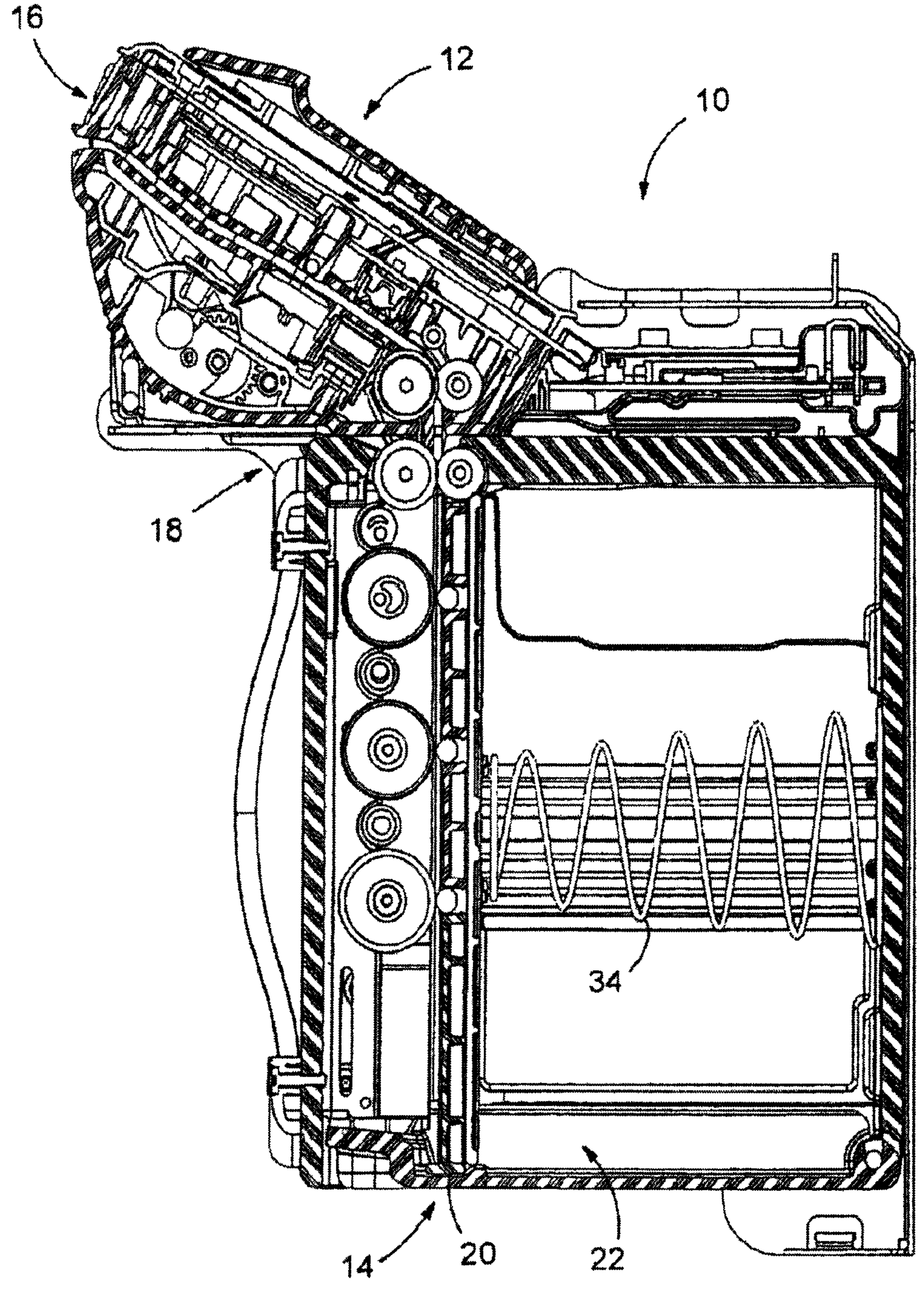
FIG. 1 illustrates an example of document acceptor that incorporates a document stacker according to the invention.

FIG. 1 illustrates an example of an implementation of a document acceptor assembly 10 that includes a document handling device such as a banknote validator 12 (or other document acceptor) connected to a piston-type currency stacker 14.

The acceptor 12 determines whether inserted currency or other documents are acceptable. As used herein, the phrase "currency documents" includes, but is not limited to, banknotes, bills, security documents, paper currency checks, coupons, tickets and the like that may be used as legal tender in exchange for goods or service, and that may be inserted into a document handling device for validation and storage in return for goods or services.

Banknotes may be inserted one at a time into the acceptor 12 at entrance 16. From the entrance 16, the banknote 38 is transported through the acceptor 12 to the acceptor's banknote output by pairs of pulleys or rollers and belts that grip the side edges of the banknote and that may be driven by a motor and drive train according to known techniques.

As the banknote is transported through the acceptor 12, the banknote may be tested by a group of sensors to ascertain its validity and denomination. Output signals from the sensors may be processed by logic circuits in the acceptor 12 to determine whether the banknote is acceptable. Any of various known techniques using optical, magnetic, inductive or other types of sensors may be used to test the banknote. A banknote which is unacceptable may be ejected back out through the entrance 16.

An acceptable banknote is transported into an interconnection region 18 in which the acceptor 12 and stacker 14 are connected together. The interconnection region 18 establishes a smooth uninterrupted path for a banknote to follow when leaving the acceptor 12 and entering the stacker 14. The accepted banknote is transported from the stacker's entrance into a pre-storage channel 20. In a fashion somewhat analogous to the way that a picture frame holds a picture, the channel 20 "frames" the banknote at its side edges and holds it stiff prior to stacking. The piston-type stacker 14, described in greater detail below, pushes the accepted banknote into a cassette 22 where it is stored until removed by service personnel. The cassette is designed to be readily removed or opened by service personnel so that stacked banknotes can be removed.

Figure 2:
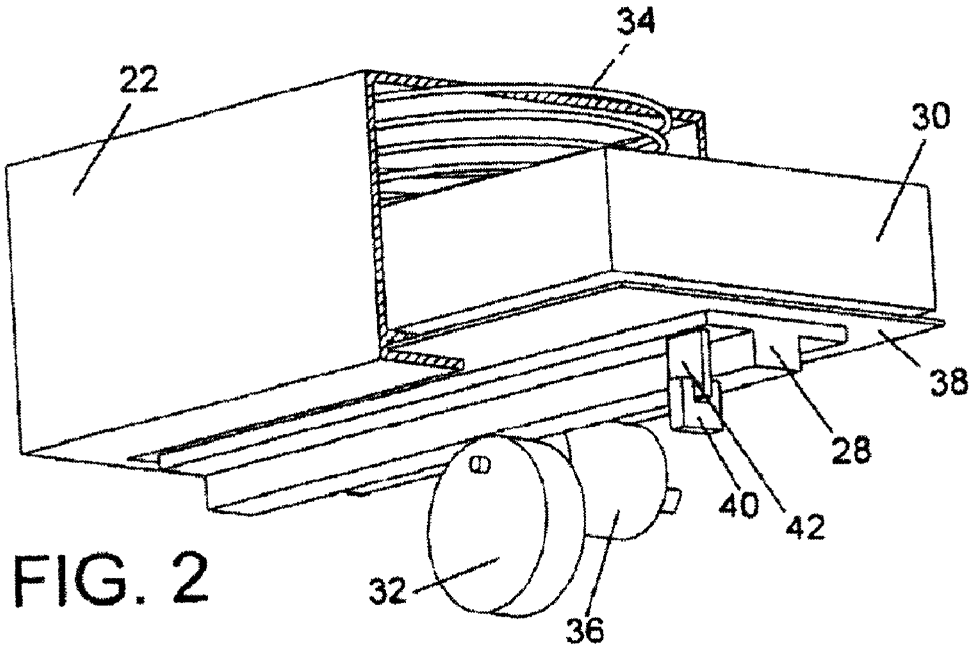
FIG. 2 is an isometric partial section view of a document stacker.
Figure 3:
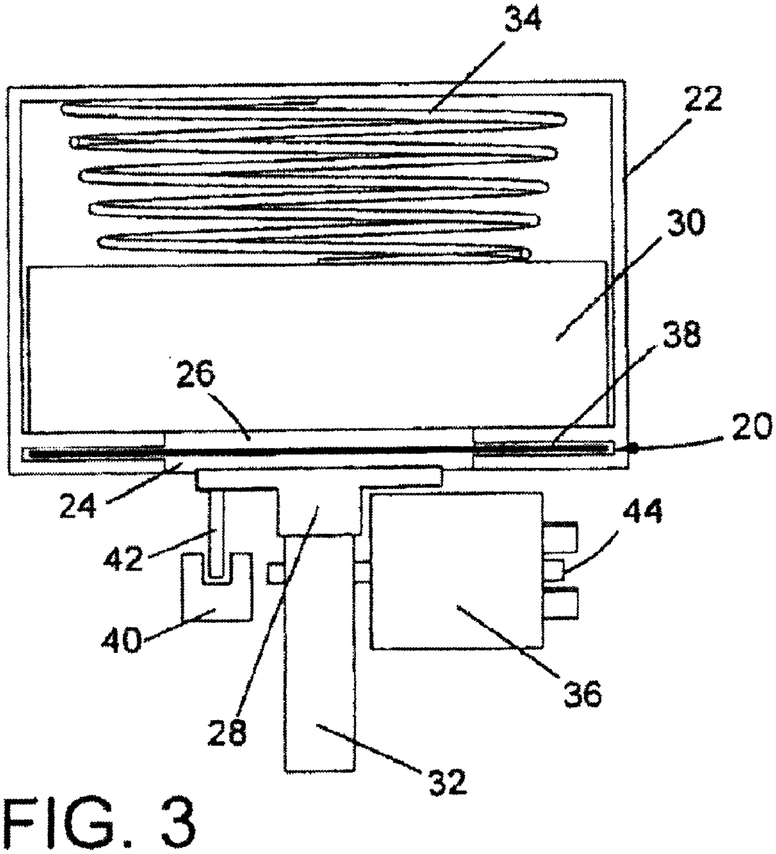
FIG. 3 is an end view of the document stacker of FIG. 2 with a piston in the home position.

As shown in FIGS. 2 and 3, the stacker 14 includes two apertures 24, 26 that permit a piston 28 to freely pass. The aperture 24 should be sufficiently small that stacked banknotes or other documents 30 cannot pass through the aperture without some bending. The piston 28 may be in direct contact with a cam 32 that is coupled to an electric motor 36 or other actuator. For example, a permanent magnet direct current (DC) motor may be used. A conical spring 34 provides a clamping force that ensures that the banknote 38 to be stacked does not slide across the document stack 30. The spring 34 also keeps the documents in the stack 30 closely packed and stable.

An optical switch 40 is provided for detecting the presence of a flag 42 that indicates when the piston 28 is in the home position (i.e., when the piston is not obstructing the pre-storage document channel 20). The flag 42 may be formed, for example, as a protrusion from the backside of the piston 28.

Figure 10:
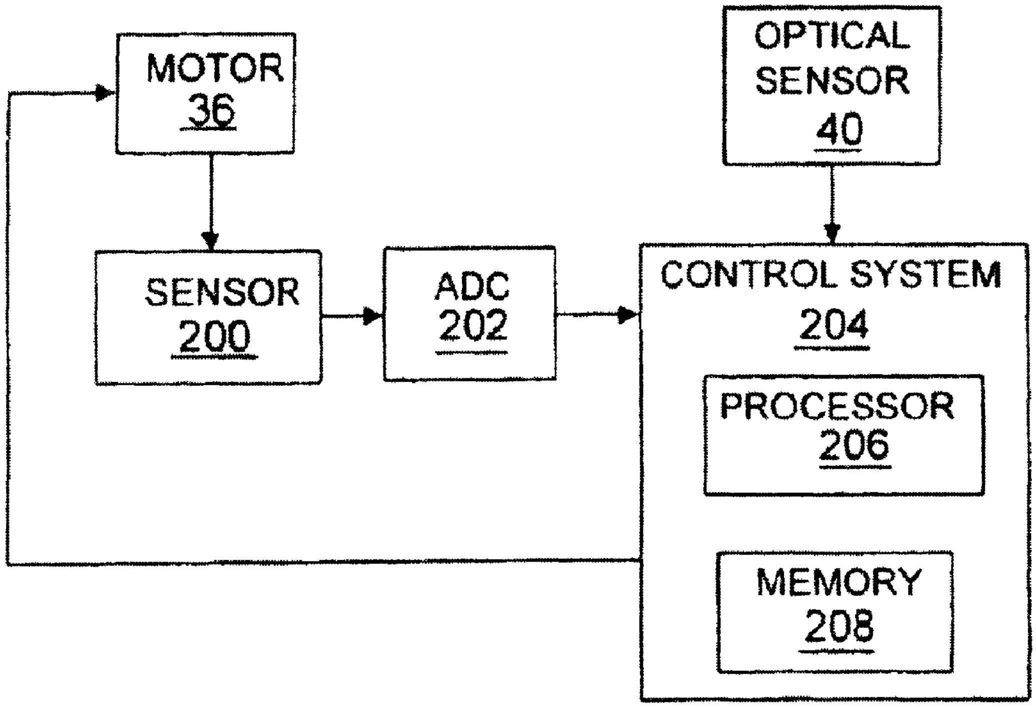
FIG. 10 is a block diagram illustrating a controller for the stacker.

A sensor is provided to sense electrical signals from the motor during a document stacking operation. In a particular implementation, as shown in FIG. 10, a motor current sensor 200 is coupled to the motor 36 and allows the motor current to be measured. The sensor 200 may include, for example, a series resistor coupled between the motor 36 and an analog-to-digital converter (ADC) 202. Output signals from the ADC 202 are provided to a control system 204.

The control system 204 may include a microprocessor 206 to control when the motor 36 is turned on or off in response to signals from the optical sensor 40 and the motor current sensor 200. As discussed below, the microprocessor 206 also can measure the passage of time using, for example, an interrupt software routine driven by a clock signal.

FIGS. 3 through 7 illustrate the sequence of operation for stacking a document according to one implementation. For the purposes of illustration, it may be assumed that the cassette 22 is empty or nearly empty. FIG. 3 illustrates the stacker mechanism in the home position, corresponding to FIG. 2. In that position, the piston 28 is fully retracted, and the flag 42 blocks the optical switch 40. A document 38 is in the pre-storage channel 20 ready to be stacked in the cassette 22.

Figure 4:
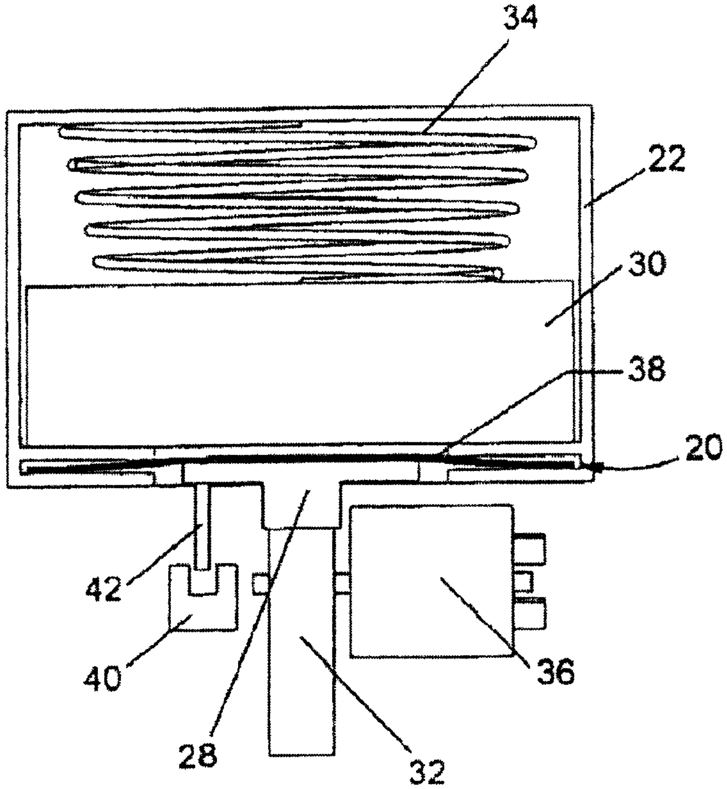
FIGS. 4-7 are end views of the document stacker of FIG. 2 illustrating various stages of the document stacking cycle.

During the initial stage of the stacking state, power is applied to the motor 36, and an eccentric begins to rotate, thereby lifting the piston 28. As illustrated in FIG. 4, after a small amount of rotation has occurred, the piston 28 is in contact with the document 38, thereby causing the document to deform slightly. In this state, the flag 42 has cleared the optical switch 40.

Figure 8:
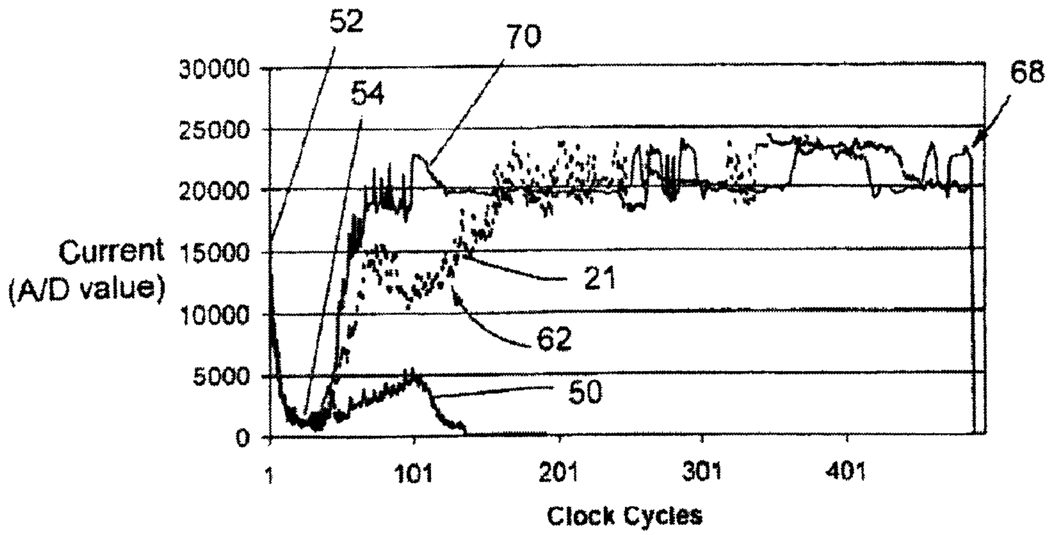
FIG. 8 is a graph showing examples of motor current curves.
Figure 9:
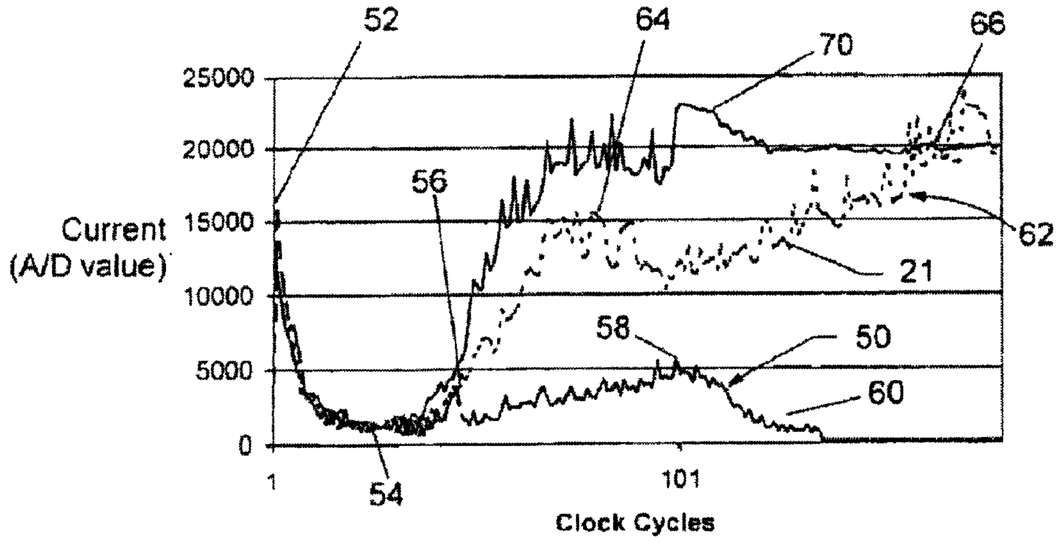
FIG. 9 is an enlarged version of a portion of the graph of FIG. 8.

A DC motor (such as motor 36) with a substantially fixed input voltage draws a current that is approximately proportional to the mechanical load placed upon it. For example, during the transition from the home position to the initial stacking stage of FIG. 3, the piston 28 encounters little mechanical resistance. An example of the profile of motor current is illustrated in FIGS. 8 and 9. The profile 50 indicates a brief inrush current 52 followed by a low trough 54 that reflects the light mechanical load.

Figure 5:
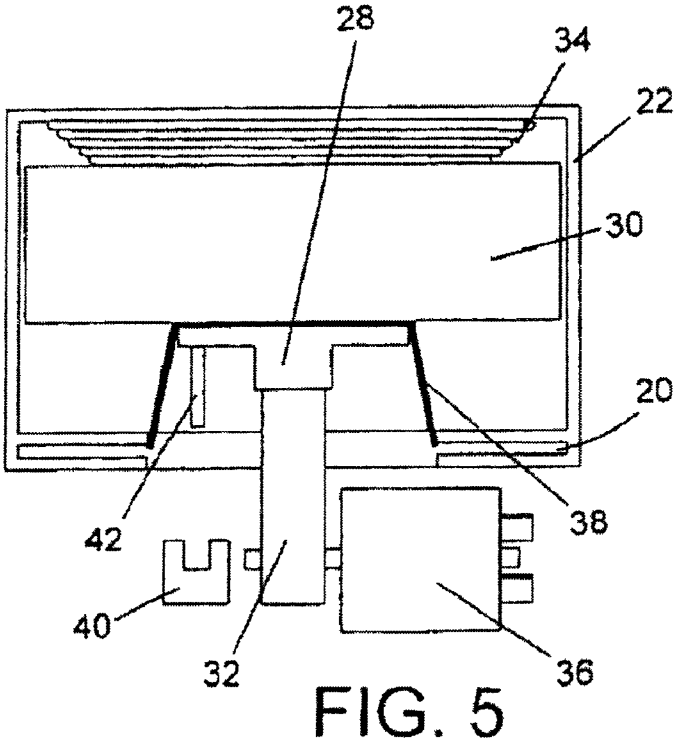

FIG. 5 illustrates the stacker 14 after the document 38 has been stripped from the pre-storage document channel 20. During this stage, the piston 28 encounters some resistance as a result of sliding friction, the document's resistance to bending and an increase in the force of the spring 34. As shown in FIGS. 8 and 9, the motor current increases to a peak 56 and then decreases briefly.

Figure 6:
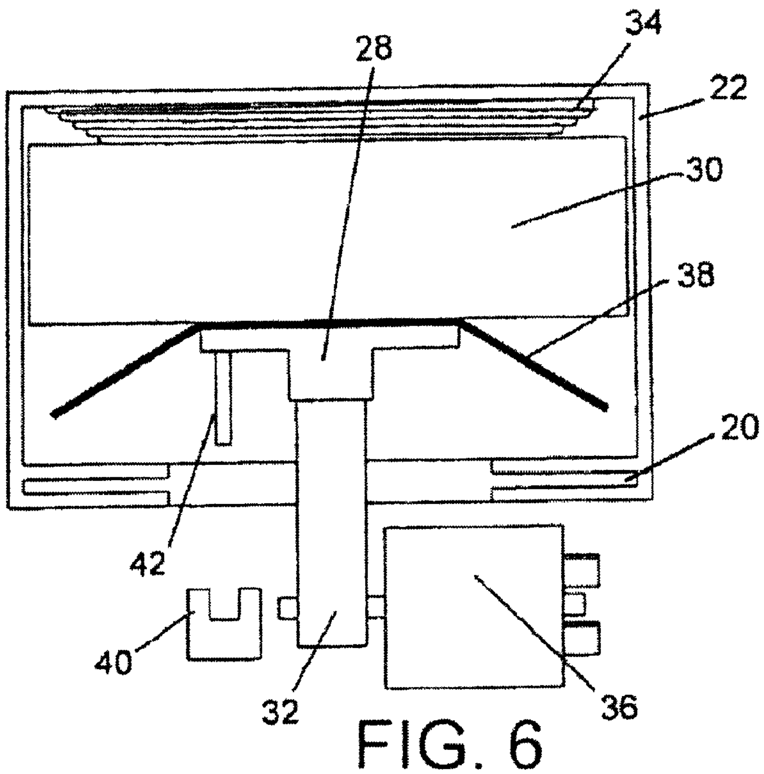

When the piston 28 is fully extended as shown in FIG. 6, the spring 34 exerts its maximum force, and the motor current reaches its maximum value as indicated by 58 in FIG. 9. The document 38 has completely passed from the pre-storage channel 20 and is located within the cassette 22.

Figure 7:
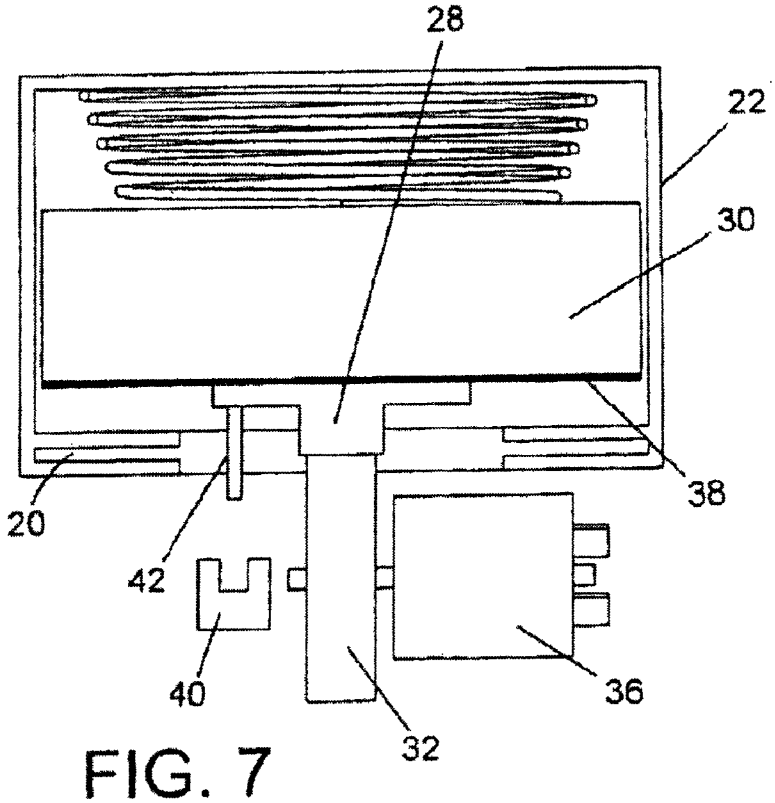

Next, the piston 28 reverses direction and travels in the opposite direction as illustrated by FIG. 7. During the return stroke, the force of the spring 34 helps push the piston 28 back toward its home position (FIGS. 2 and 3). Therefore, during the return stroke, the motor current is at a relatively low value as indicated by 60 in FIG. 9.

Under different circumstances, such as when the cassette 22 is substantially full, the expected values of motor current may vary significantly from the values indicated by curve 50. An example of the motor current profile when the cassette 22 is substantially full is indicated by curve 62 (FIGS. 8 and 9). In that case, the motor current during the home position and the initial stacking stage, corresponding to FIGS. 3 and 4, is similar to the motor current values of curve 50. In the subsequent stacking stages, however, the motor current values diverge. For example, the peak motor current value 64, which corresponds to the peak value 56 in curve 50, occurs at a higher value and at a later time. The later timing of the peak value 64 when the cassette 2 is full may be attributed to the fact that the stacker mechanism 14 slows down under the higher load. In the illustrated implementation, the full extension state of the piston 28, as shown in FIG. 6, is not attained when the cassette 22 is full (or almost full) to capacity. Instead, the motor current rises to a value 66, where it more or less remains for a period of time as a result of the motor 36 stalling. After an algorithm in the host controller 204 (FIG. 10) indicates that a maximum time has elapsed, the controller reverses the motor 36 so the stacker can return to its home position. In the example of FIG. 8, that occurs after about 500 clock cycles, identified by the reference numeral 68. The controller 204 then may report that the cassette is full and may place the banknote acceptor in an "out-of-service" mode until a replacement cassette is installed.

In some situations, the pre-storage document channel 20 may become obstructed by an object other than a genuine, acceptable document. Curve 70 (FIGS. 8 and 9) illustrate an example of the motor current profile when such an abnormal event occurs.

In various implementations, one or more values indicative of the motor's actual operation may be compared to one or more reference values to determine whether the motor and, therefore, the stacker, is operating properly. Reference values and expected current profiles may be stored, for example, in memory 208 associated with the control system 204 (see FIG. 10).

To predict the time at which the cassette is expected to reach its full capacity, the rate at which documents are being inserted into the cassette is determined. The cassette's actual capacity is determined as well. That information then is used to predict an approximate time when the cassette will reach its full capacity. If it determined that the cassette will reach its full capacity within some predetermined amount of time, then an indicator is provided to alert service personnel to the status of the cassette. The currency acceptor's processor can be used to track the status of the cassette, make any required calculations, and generate appropriate signals to provide the indicator.

Various techniques can be used to track the number of documents stored in the cassette. For example, the processor associated with the currency acceptor can keep track of the number of stack cycles that occur. The completion of each cycle would indicate that another document has been stored in the cassette. As described above, a stack cycle begins with the piston in the "home" position (FIG. 2). During the cycle, the stacking motor is energized, the cams rotate, and the document is pressed into the cassette. Eventually, the document is fully committed to the cassette (FIG. 5). The motor continues to run until the cams rotate 360 degrees, and the piston returns to its starting "home" position (FIG. 2) to complete the cycle.

In some implementations, the capacity of the cassette is determined based on the motor current. As the cassette nears its full capacity, the force required to stack a document increases and the current in the motor increases. Thus, the increase in force can be detected by measuring the current draw of the stacker motor. The increase is predictable, and thresholds can be determined dynamically or can be predefined. The thresholds indicate the capacity status. For example, with reference to FIG. 8, curve 62 corresponds to a cassette at high capacity (i.e., at full or near-full capacity). Once the characteristics for the particular stacker-type are know, a liner calculation can be applied to provide finer resolution.

According to some implementations, once the number of documents stored in the cassette has been determined, the physical indicator is provided if the number of documents in the cassette has reached a pre-defined threshold.

Such techniques, however, do not account for the rate at which the documents are being received and stacked in the cassette. Thus, for example, if documents are being stacked at a relatively slow rate (e.g., if customers are not using the gaming machine very often), the cassette might not become full for a relatively long time. On the other hand, if the current document feed-rate is relatively high, the cassette may reach its full capacity sooner.

To obtain a better sense of when the cassette is likely to reach full-capacity, the rate at which the documents are being stacked during a specified period (e.g., the previous half-hour) can be monitored and used together with the actual number of documents currently stored in the cassette to predict the amount of time until the cassette will become full or substantially full. Such an approach can provide an adjustable amount of warning time and compensate for different play (i.e., document insertion) rates. Thus, a currency acceptor associated with a busy gaming machine will issue its alarm sooner than the currency acceptor associated with a more slowly played machine. The warning can also be issued in degrees as the cassette's maximum capacity is approached (i.e., 10%, 20%, etc.).

A particular implementation uses the following comparison to determine whether the cassette is at, or will be at, substantially full capacity in the near future:

$$Is((CC+(CR*WT))>\text{MAX})?$$

where,

MAX=maximum capacity (i.e., number of documents) of the cassette

CC=current document count in the cassette

CR=current document feed rate (e.g., documents per hour)

WT=warning time (in hours)

The value for "CR" may be recalculated on a periodic basis, for example, every thirty minutes. The value for "WT" may be set dynamically by the host or through a pre-configuration setting.

If the value (CC+(CR*WT)) is greater than the value MAX, then the cassette is either already at full capacity or likely to reach its full capacity soon, and an indicator is provided. Preferably, the indicator is controlled directly by the currency acceptor and can be sensed by service personnel. For example, the indicator can be a visual warning such as a light emitting diode (LED) or other light source, located on the top of the gaming machine, being turned on. Such an LED or other physical indicator can be located elsewhere such as on the bezel of the currency acceptor. In some implementations, turning on the LED serves as the indicator. In other implementations, the blinking rate of the LED indicates the anticipated time until the cassette reached full capacity. For example, in particular scenario, a faster blink rate would indicate that the cassette is expected to become full sooner than if the blink rate were slow. Audio warnings (e.g., a beeping or other sound) also can be used in addition to, or instead of, visual warnings. Alternatively, or in addition to the physical indicator, a message may be sent to a remote location (i.e., remote from the currency acceptor and host machine) to alert service personnel.

The currency acceptor can be configured to clear the indicator (e.g., turn off the LED) automatically once the cassette is changed.

Various aspects of the system may be implemented in hardware, software or a combination of hardware and software. Circuitry, including dedicated or general purpose machines, such as computer systems and processors, may be adapted to execute machine-readable instructions to implement the techniques described above. Computer-executable instructions for implementing the techniques can be stored, for example, as encoded information on a computer-readable medium such as a magnetic floppy disk, magnetic tape, or compact disc read only memory (CD-ROM). In one particular implementation, the computer-readable medium includes non-volatile electronic memory such a PROM, EPROM or FLASH. Algorithms also may be implemented, for example, through use of a programmable gate array.

The foregoing implementations, including the motor current profiles, are intended as examples only and are not intended to limit the scope of the invention.

The techniques may be employed in connection with stackers other than piston-type stackers, including, for example, stackers in which banknotes are wrapped around a drum or in which banknotes are rolled onto a stack. The techniques also may used with stackers using actuators other than DC motors, including, for example, actuators for stepper motors, AC motors and brushless motors. In some cases, signals other than current, including, for example, the phase lag may be used to measure the actuator load.

Other implementations are within the scope of the claims.

What is claimed is:

1. A method of providing an indication of the status of a document storage cassette attached to a document acceptor that is coupled to a host machine, the method being performed by the document acceptor and comprising:

monitoring a number of documents in the cassette;

monitoring a feed-rate of documents being inserted into the cassette;

predicting when a capacity of the document storage cassette is expected to reach a specified level based on the feed-rate and the number of documents currently in the cassette; and generating an indicator or causing a message to be sent when it is determined that the capacity of the document storage cassette is expected to reach the specified level within a specified amount of time, wherein the indicator is in the vicinity of the document acceptor and is generated when the capacity of the document storage cassette reaches the specified level, wherein generating the indicator includes causing a blinking rate of a light source to change in accordance with a predicted amount of time until the document storage cassette reaches full capacity.

2. The method of claim 1 wherein said estimating includes estimating when the capacity of the document storage cassette is expected to reach its full capacity.

3. The method of claim 2 wherein the document acceptor is a currency validator.

4. The method of claim 1 wherein the indicator comprises a visual or audio indicator.

5. The method of claim 1 wherein the document acceptor is a currency validator.

6. The method of claim 5 wherein the method further includes determining a validity and denomination of currency documents inserted into the currency validator and directing acceptable currency documents to the cassette.

7. An apparatus comprising:

a document acceptor;

a document storage cassette attached to the document acceptor; and a light source;

wherein the document acceptor is operable to:

monitor a number of documents in the cassette;

monitor a feed-rate of documents being inserted into the cassette;

predict when a capacity of the document storage cassette is expected to reach a specified level based on the feed-rate and the number of documents currently in the cassette; and generate a signal to provide an indicator or to cause a message to be sent when it is determined that the capacity of the document storage cassette is expected to reach the specified level within a specified amount of time;

wherein the indicator is in the vicinity of the document acceptor and is generated when the capacity of the document storage cassette reaches the specified level; and wherein the signal causes a blinking rate of the light source to change in accordance with a predicted amount of time until the document storage cassette reaches full capacity.

8. The apparatus of claim 7 wherein the document acceptor is operable to estimate when the capacity of the document storage cassette is expected to reach its full capacity.

9. The apparatus of claim 8 wherein the document acceptor is a currency validator.

10. The apparatus of claim 7 wherein the indicator comprises a visual or audio indicator.

11. The apparatus of claim 7 wherein the document acceptor is a currency validator.

12. The apparatus of claim 11 wherein the document acceptor is further operable to determine a validity and denomination of currency documents inserted into the currency validator and to direct acceptable currency documents to the document storage cassette.

13. The apparatus of claim 7 wherein the document acceptor is operable to re-determine the feed rate on a fixed periodic basis.

14. The apparatus of claim 7 wherein the document acceptor is operable to monitor the feed rate of documents based on a number of stack cycles that occurs during a specified period of time.

15. The apparatus of claim 7 wherein the document acceptor is operable to monitor a number of documents stored in the cassette based on values of motor current.

16. A method of providing an indication of the status of a document storage cassette attached to a document acceptor that is coupled to a host machine, each step in the method being performed by at least one of the host machine or the document acceptor, the method comprising:

monitoring a number of documents in the cassette;

monitoring a feed-rate of documents being inserted into the cassette;

predicting when a capacity of the document storage cassette is expected to reach a specified level based on the feed-rate and the number of documents currently in the cassette; and generating an indicator or causing a message to be sent when it is determined that the capacity of the document storage cassette is expected to reach the specified level within a specified amount of time;

wherein the indicator in the vicinity of the document acceptor and is generated when the capacity of the document storage cassette reaches the specified level wherein generating the indicator includes causing a blinking rate of a light source to change in accordance with a predicted amount of time until the document storage cassette reaches full capacity.

17. The method of claim 16 wherein said estimating includes estimating when the capacity of the document storage cassette is expected to reach its full capacity.

18. The method of claim 16 wherein the indicator comprises a visual or audio indicator.

19. The method of claim 16 wherein the document acceptor is a currency validator.

* * * * *